(12) United States Patent
Poskin et al.

(10) Patent No.: US 7,607,453 B2
(45) Date of Patent: Oct. 27, 2009

(54) NON-FREEZE WALL HYDRANT

(76) Inventors: Joe Poskin, 4515 E. 139th, Grandview, MO (US) 64030; Scott Brady, 4515 E. 139th, Grandview, MO (US) 64030

( * ) Notice: Subject to any disclaimer, the term of this patent is extended or adjusted under 35 U.S.C. 154(b) by 257 days.

(21) Appl. No.: 11/077,923

(22) Filed: Mar. 11, 2005

(65) Prior Publication Data
US 2006/0201553 A1    Sep. 14, 2006

(51) Int. Cl.
*F16K 1/04*    (2006.01)
(52) U.S. Cl. .................................. 137/360; 251/266
(58) Field of Classification Search ............... 137/217, 137/218, 360; 251/266, 274, 318, 324, 319
See application file for complete search history.

(56) References Cited

U.S. PATENT DOCUMENTS

| | | | |
|---|---|---|---|
| 1,317,789 A * | 10/1919 | Hoar | 137/360 |
| 3,175,575 A * | 3/1965 | Kennedy | 137/360 |
| 3,563,508 A * | 2/1971 | DeLorenzo | 251/63.5 |
| 3,952,770 A | 4/1976 | Botnick | |
| 4,475,570 A * | 10/1984 | Pike et al. | 137/218 |
| 4,644,970 A * | 2/1987 | Lowry | 137/625.41 |
| 4,909,270 A * | 3/1990 | Enterante et al. | 137/107 |
| 5,012,833 A * | 5/1991 | Hunley et al. | 137/15.02 |
| 5,060,910 A * | 10/1991 | Iwata et al. | 251/129.05 |
| 5,158,105 A | 10/1992 | Conway | |
| 5,228,471 A * | 7/1993 | Hoeptner, III | 137/218 |
| 5,355,907 A * | 10/1994 | Hoeptner, III | 137/218 |
| 6,386,223 B1 * | 5/2002 | Hoeptner, III | 137/218 |
| 6,425,503 B1 * | 7/2002 | Scheindel | 222/402.22 |
| 6,761,183 B1 * | 7/2004 | Hoeptner, III | 137/218 |
| 6,935,358 B1 * | 8/2005 | Hoeptner, III | 137/218 |

* cited by examiner

*Primary Examiner*—John Fox
(74) *Attorney, Agent, or Firm*—Mark Manley

(57) ABSTRACT

A freezeless hydrant having an inlet and outlet, the hydrant including an elongated pipe connecting a valve to an operator. A stem has a length and has a first end engaged with operator threads and a second end carrying a stopper portion of the valve. A portion of the stem engages projections on an inner portion of the pipe such that the valve operator stem is held against rotational movement. The stopper portion includes a first and second seal face such that rotational movement of the operator results in longitudinal movement of the stem and in closing of the valve by moving the stopper portion and the first seal face into compressive sealing engagement with a face of a reduced diameter portion of the pipe and the second seal into movable frictional engagement with an inner diameter of the reduced diameter portion. The hydrant can be mounted in a hydrant box on the exterior of a structure. The hydrant allows for a flow of water across the valve face and can be mounted flat to a surface with a single pipe diameter projecting from the flat back surface of a hydrant mounting plate. The mounting plate can include a tang to prevent rotation of the hydrant as the valve is operated.

8 Claims, 8 Drawing Sheets

Figure 8
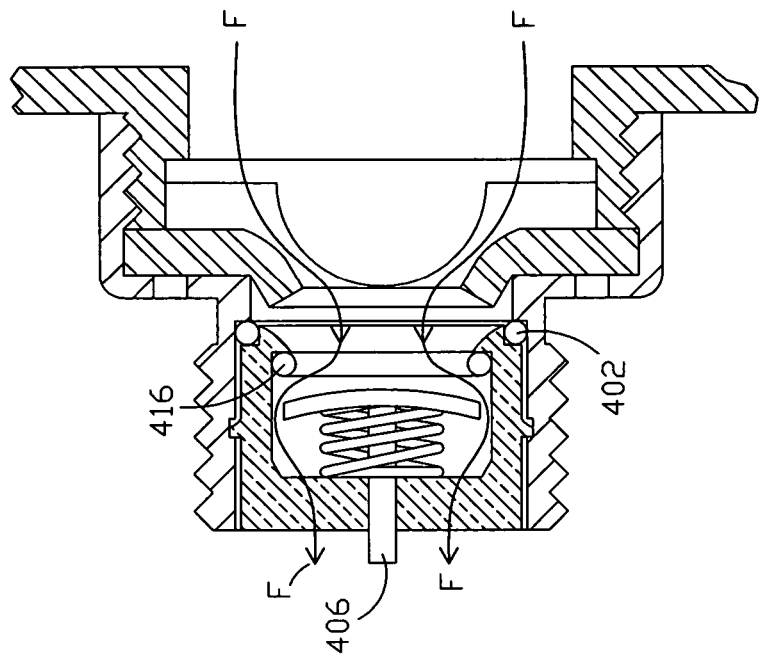
Fig. 8b
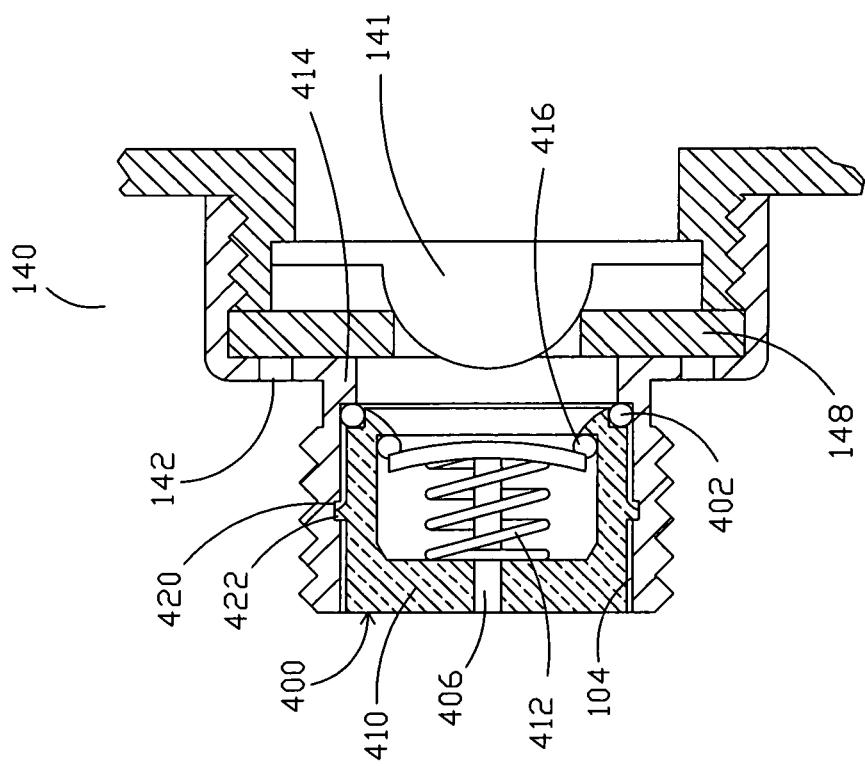
Fig. 8a

NON-FREEZE WALL HYDRANT

RELATED APPLICATIONS

None

BACKGROUND OF THE INVENTION

In the water hydrant industry it is desirable to build outdoor hydrants that are easy to install, freeze proof and that can prevent undesirable flows such as backflow where contaminated water from outside a hydrant might flow back into the hydrant and the hydrant water supply.

U.S. Pat. No. 3,952,770 to Botnick shows one prior art approach to an outdoor hydrant. The hydrant of Botnick is typical in terms of its difficulty to install. The hydrant has a face 60 designed to mount against the surface of a building but the cross section shape behind the face is very complex making the hydrant difficult to mount. In a new installation typically a large hole is left until the hydrant is installed and then the wall is filled in around the hydrant. To retrofit the hydrant in an existing wall a worker will drill a hole large enough for the pipe (A) and possibly several smaller holes and then has to carve out around the hole using a chisel or whatever tool he might have to hand carve the opening to match the cross sectional shape of the hydrant. The sealing stopper of Botnick rotates and moves longitudinally as it seals leading to excessive wear on the seals.

U.S. Pat. No. 5,158,105 to Conway discloses an anti-freeze hydrant 1 having a pipe section 22 that connects the operator near cap 50 to the valve 65. Conway uses a rotating shaft 33 to connect to the valve 65 which can close sequentially. In the valve closed position water can drain from the hydrant. One undesirable effect of Conway is that the operator end of the shaft 33 moves longitudinally in and out of the cap 50. Another is that the seals 35, 65 can experience increased wear due to the combination of rotational and longitudinal movement.

As can be seen there is a need for a hydrant that is easy to install and maintain. There is also a need for a hydrant that has a dual back flow preventer in a compact design. There is further a need for a hydrant that prevents freezing and undesirable backflow.

SUMMARY OF THE INVENTION

The present invention relates to a freezeless hydrant having an inlet and an outlet, the hydrant including an elongated pipe connecting a valve to an operator, the operator including an end piece including threads. A stem has a length and has a first end engaged with the threads and a second end carrying a stopper portion of the valve. A portion of the stem engages projections on an inner portion of the pipe such that the stem is held against rotational movement. The stopper portion includes a first seal face such that rotational movement of the operator results in longitudinal movement of the stem and in closing of the valve by moving the stopper portion and multiple seal faces into compressive and frictional sealing engagement with a reduced diameter portion of the pipe.

These and other advantages of the present invention will become apparent from the detailed description of the invention.

BRIEF DESCRIPTION OF THE DRAWINGS

FIG. 8 shows details of a second embodiment

DETAILED DESCRIPTION OF THE DEVICE

Figure 1:
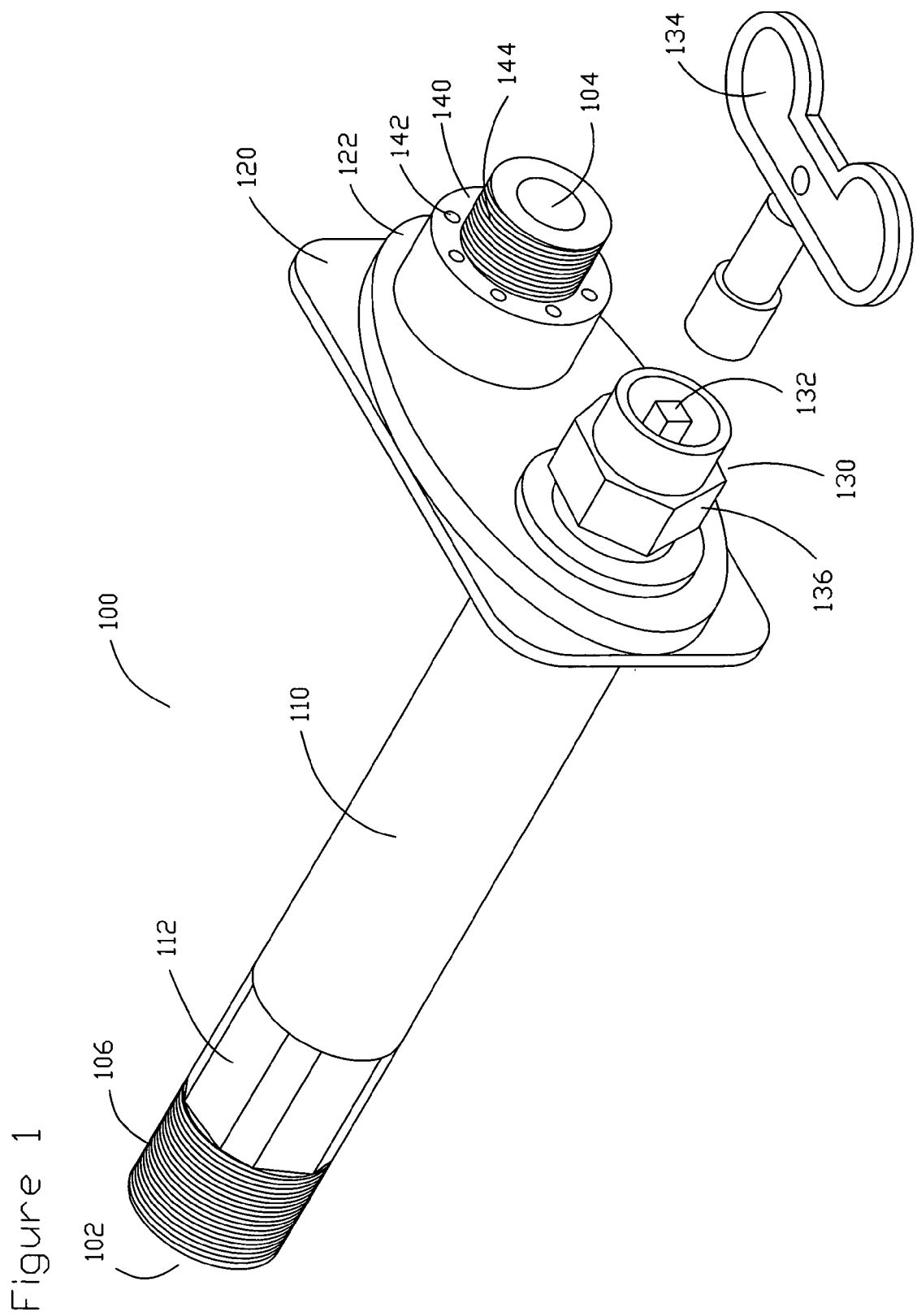
FIG. 1 shows an external view of the hydrant.

FIG. 1 shows an external view of the hydrant 100. The hydrant 100 can include a water inlet 102 and a cylindrical water outlet 104. The water inlet 102 can include threads 106 to allow it to be connected to a source of water (not shown) such as the plumbing of a structure. The water inlet 102 can be part of a water pipe 110 that can include a valve seat section 112. The water pipe 110 can be connected to a generally flat, planar mounting face 120 that can mount on a flat surface such as the wall of a structure. The mounting face 120 can include an elliptical shell 122 that allows water to flow across the mounting face 120 from the end of the pipe 110 adjacent mounting face 120 across to outlet 104. The outlet 104 can be part of a vacuum breaker/check valve 140 attached to the shell 122. The vacuum breaker/check valve 140 can include holes 142 that will allow air to flow into the hydrant 100 if a vacuum occurs at inlet 102. This vacuum breaker/check valve 140 prevents a vacuum at 102 from sucking contaminated water through a hose H (See FIG. 4) into a structure's water supply.

FIG. 1 further shows that the hydrant 100 can include a hydrant control 130 including an operator end 132 and operator key 134 to be used to turn the operator end 132. The operator end 132 is used to turn the hydrant 100 flow off and on. The hydrant control 130 can include a cap 136 that allows for disassembly of the hydrant 100 to service seals or other hydrant components for example. The inlet 102, pipe 110 and hydrant control 130 generally lie on a single axis, the outlet 104 and vacuum breaker/check valve 140 are axially spaced, with water flowing to said outlet 104 through said shell 122.

Figure 2:
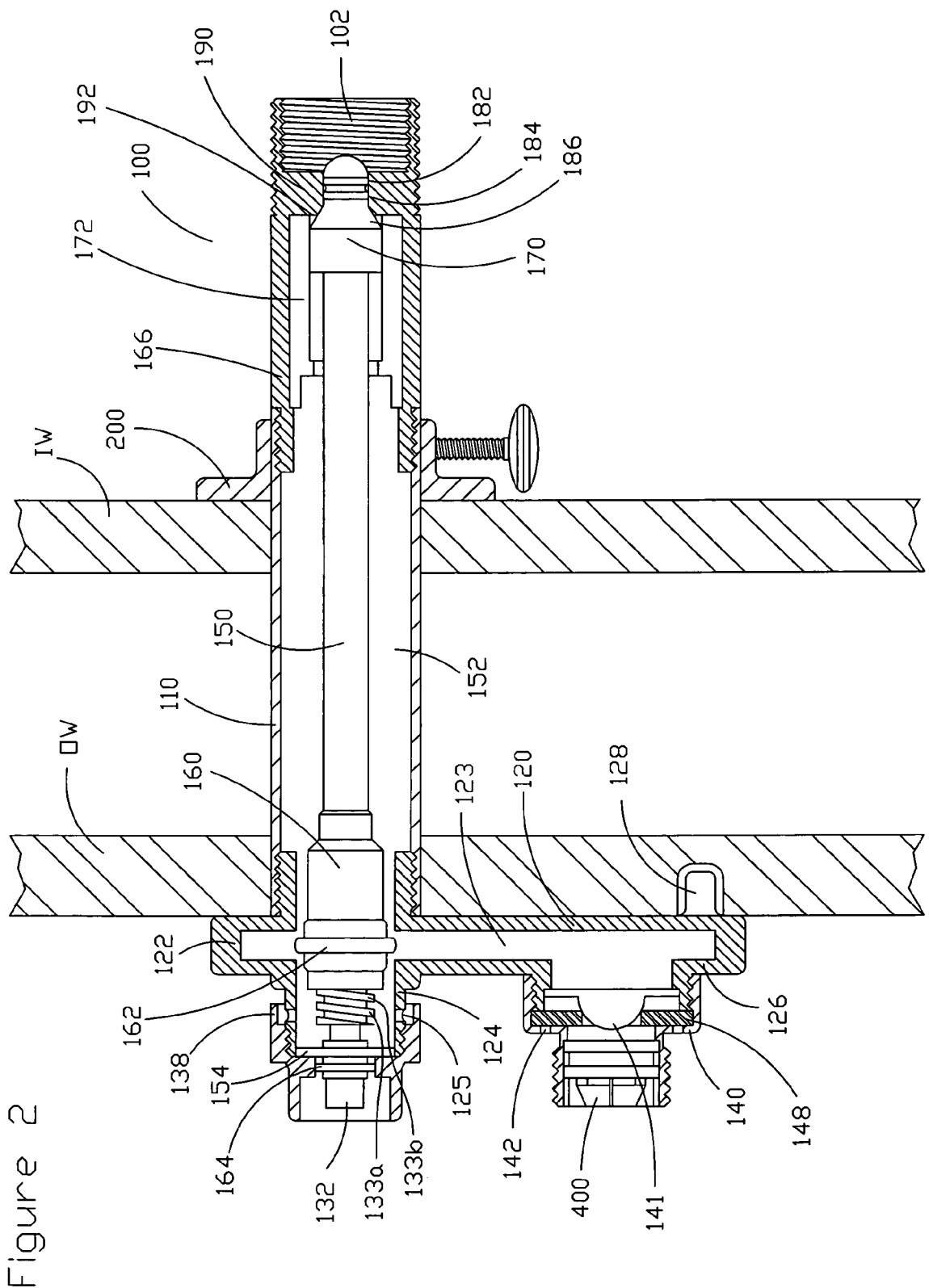
FIG. 2 shows a partial cross sectional view of the hydrant installed.

FIG. 2 shows a cross sectional view of the hydrant 100 in the closed position. The pipe 110 can pass through an outer wall OW and inner wall IW of a structure for example. The mounting face 120 can fit up against the outer wall OW and tang 128 will engage the outer wall OW to prevent the hydrant 100 from turning when the user turns operator end 132. The shell 122 includes a passage 123 that allows water to flow from the control opening 124 to the shell outlet 126 which can be threaded to receive the vacuum breaker/check valve 140. The shell 122 mounts flat against a wall OW such that the water flow through passage 123 is generally parallel to the surface of wall OW the shell 122 is mounted against and is generally perpendicular to the flow of water through said pipe 110.

As further shown in FIG. 2, the pipe 110 can include a stem 150 in cavity 152. The stem 150 generally extends from the shoulder 160 which can include an "O" ring 162, to the stopper 170. The "O" ring 162 can prevent leakage from the control opening 124 when the hydrant 100 is open. The shoulder 160 can include threads to engage the operator end 132. The operator end 132 is rotatably held against longitudinal movement by the "C" key 154. The shoulder 160 and stem 150 can move longitudinally along the length of pipe 110 but are held against rotation by projections on the inside of pipe 100 such as ribs 172. The operator end 132 can include threads 133 which can be double threads 133a, 133b. Double threads 133a, 133b can allow the operator to move the 150 at twice the longitudinal rate for each turn of the operator 132. In double threads, the thread 133a is not a part of thread 133b, they represent two separate threads on the same operator 132 so each thread has a higher pitch than would a single thread. This higher pitch allows for the higher rate of longitudinal movement for each rotation of the operator allowing a user to open and close the hydrant 100 more quickly. The double threads 133 allow for more area of thread engagement than would a single high pitched thread allowing for a smoother, but faster acting valve that is less likely to allow the stem 150 to creep. That is to say stem 150 is able to achieve a higher rate of longitudinal travel then would be possible with a single threaded operator.

Also shown in FIG. 2 the stopper 170 has seal faces 182 and 184 that can frictionally engage the reduced diameter portion 190 of the inner wall of pipe 110 to form two seals. The stopper 170 also includes a conical front face 186 that can engage a face 192 of the reduced diameter portion 190 to form a third seal, the third seal being compressive. For the purposes of this disclosure a frictional seal is a seal that forms but moves in frictional engagement with a surface while the stem 150 moves longitudinally, while a compressive seal forms and tends to stop the longitudinal motion of the stem by longitudinally compressing the seal. The hydrant 100 can include a clamp 200 that can engage the exterior of pipe 110 and the inner wall IW to hold the hydrant 100 in place. The seal faces 182, 184 and conical front face 186 can be molded upon a brass core 171.

Figure 3:
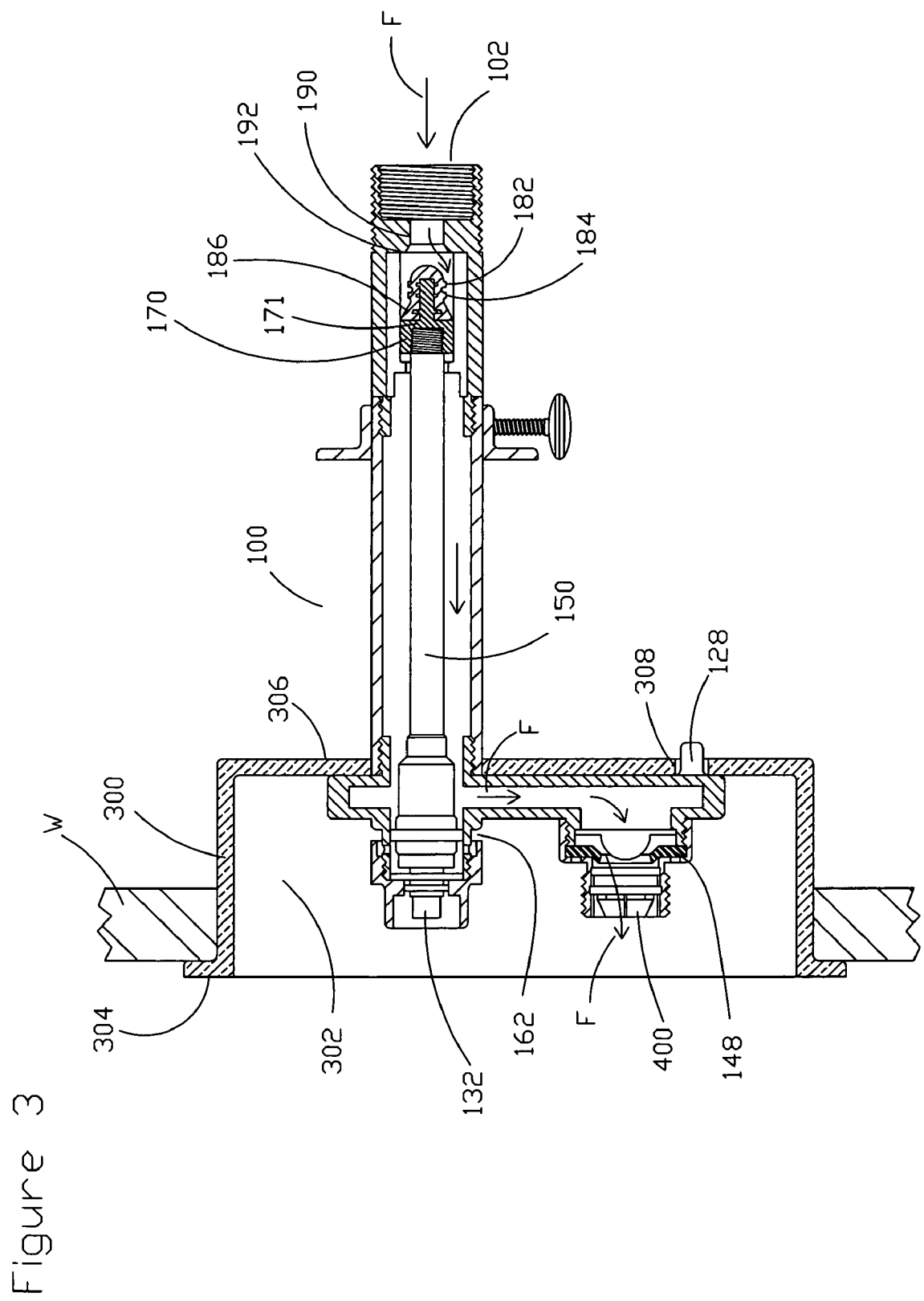
FIG. 3 shows a view of the hydrant in a different installation.

FIG. 3 shows the same hydrant 100 in cross section. The hydrant 100 is mounted in a box 300 and is shown in the open position of the hydrant 100 allowing water to flow as indicated by arrows "F". The box 300 includes an open area 302 and a plate 304 that fits against a wall W of a building for example. The box 300 gives the hydrant 100 a cleaner mounted appearance when viewed from a building exterior. The box 300 can include a back surface 306 against which the mounting face 120 is placed. The back surface 306 can include holes 308 that allow for the positioning of the tang 128 on mounting face 120 to prevent turning of the hydrant 100 when the hydrant 100 is operated. Though one hole 308 is shown, more than one hole 308 can be provided to allow for different mounting orientations of the hydrant 100 relative to the box 300.

FIG. 3 shows the hydrant 100 in the open position thereof allowing water to flow as indicated by arrows "F". When the hydrant 100 is open, the "O" ring 162 seals the opening 124 from leaking and the stopper 170 is separate from the reduced diameter portion 190. Water flows from the inlet 102 through the reduced diameter section 190 and through openings between the stopper 170 and pipe 110. Water flows out of the pipe 110 and across the mounting face 120. The water will then flow through the spider 141 of the vacuum breaker/check valve 140 and past the flexible washer 148 the flexes to allow water out the outlet 104.

Figure 4:
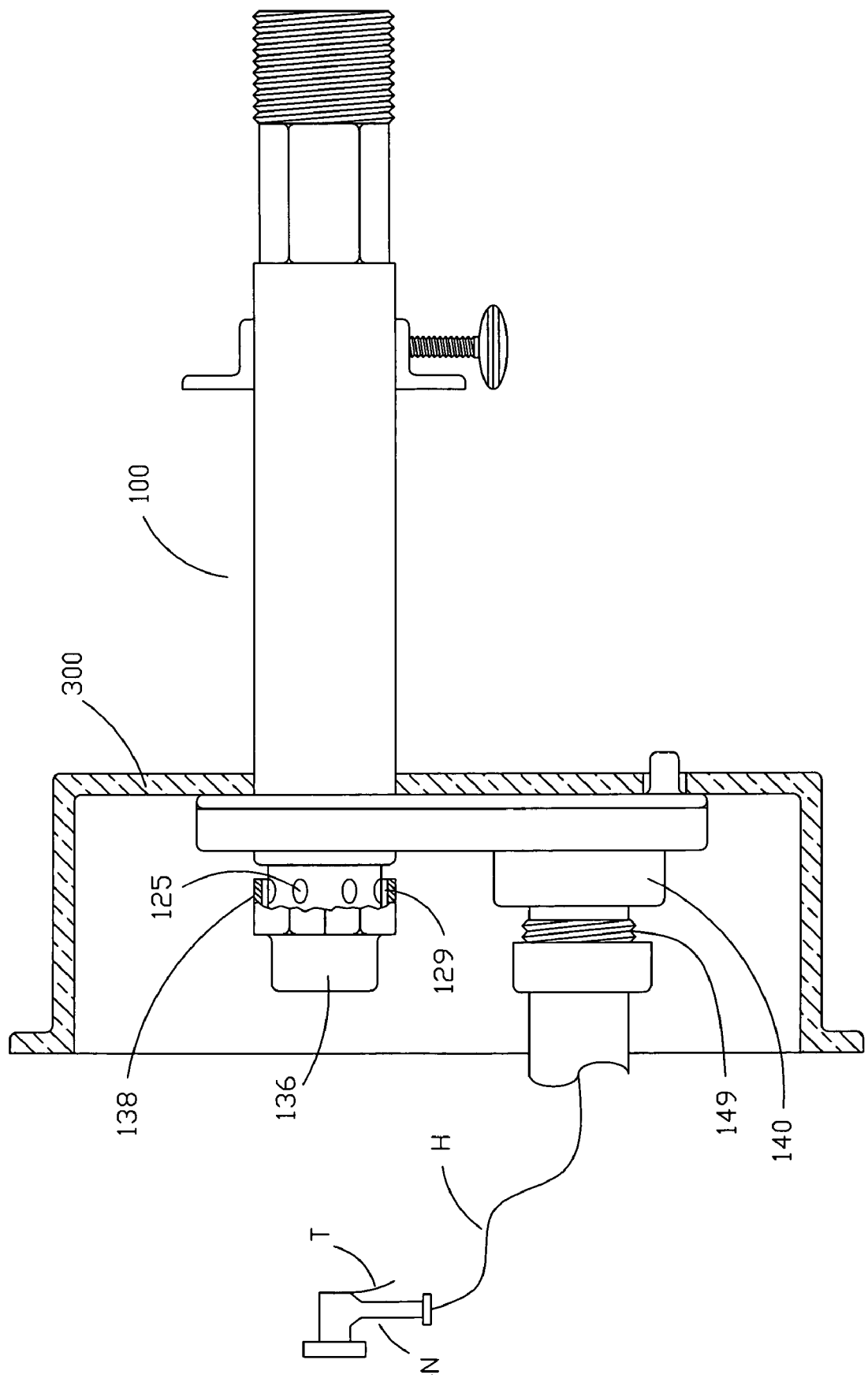
FIG. 4 shows a partial cross sectional view of the hydrant as installed in FIG. 3.

FIG. 4 shows a view of the hydrant 100 installed in the hydrant box 300. The cap 136 can include a flange portion 138 that covers holes 125 and creates a gap 129 between the flange portion 138 and the holes 125. A hose H is shown attached to the threaded end 149 of the vacuum breaker/check valve 140. The hose H can include a nozzle N with a trigger T for example.

Figure 5:
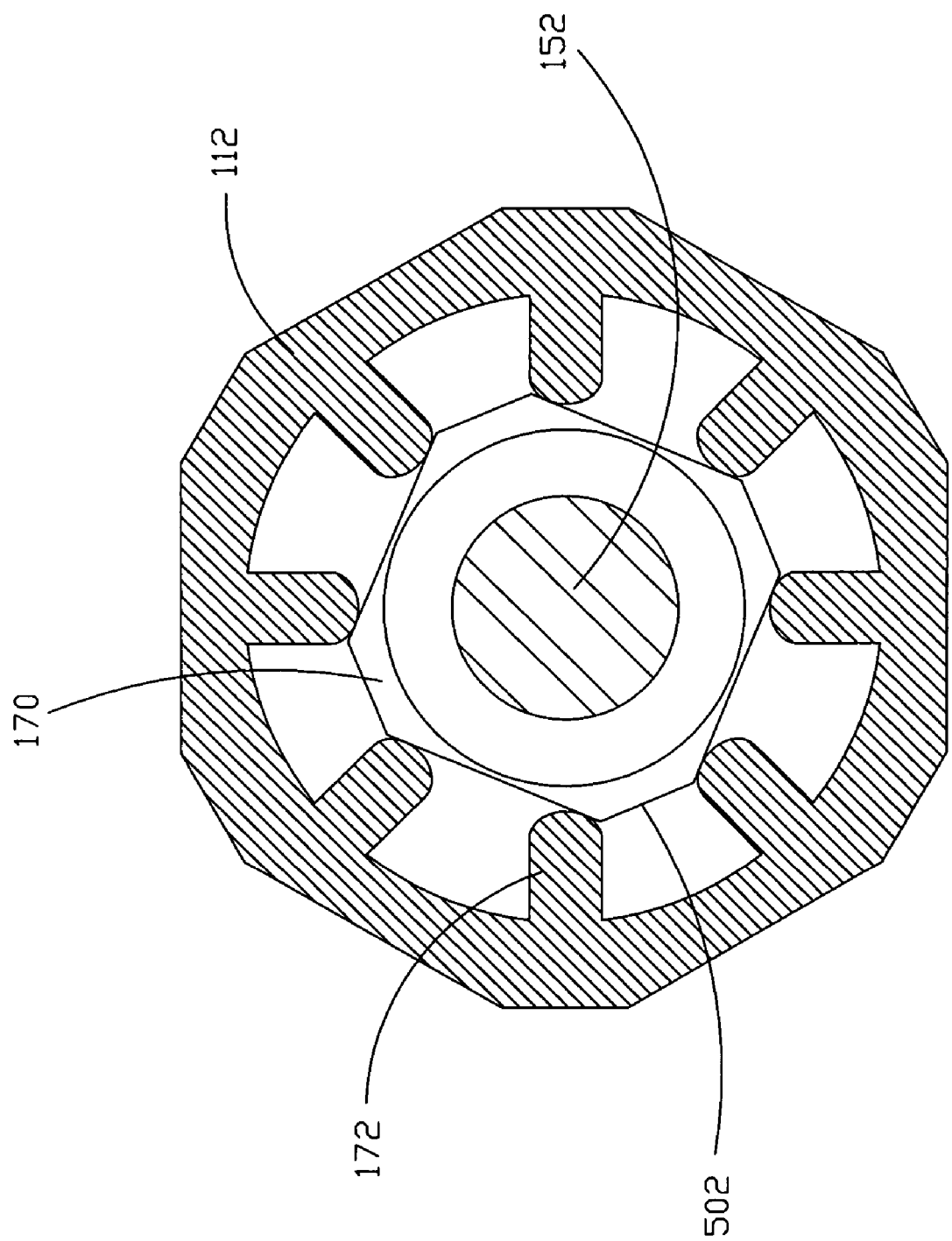
FIG. 5 shows a partial cross sectional view of a portion of the hydrant.

FIG. 5 shows a cross sectional view of the valve seat section 112 of pipe 110. The valve seat section 112 can include projections such as ribs 500. The stopper 170 can be shaped as a truncated square creating raised areas 502 that cooperate with ribs 172 to prevent the stem 152 from turning while still allowing the stem to move longitudinally. The ribs 172 have the added benefit of guiding the stopper 170 and the seal faces 182, 184, 186 (shown in FIGS. 2 and 3) into engagement with the reduced diameter portion 190. Without the ribs 172 the long stem 150 could turn, thus not allowing the valve to close and could also vibrate or chatter during closing or opening of the hydrant 100 causing excessive wear to the seal faces 182, 184, 186. It will be understood by those skilled in the art that any number or shape of ribs could be used and the stopper 170 could also have different shapes that would cooperate with the projecting ribs 172 to give the results.

Figure 6:
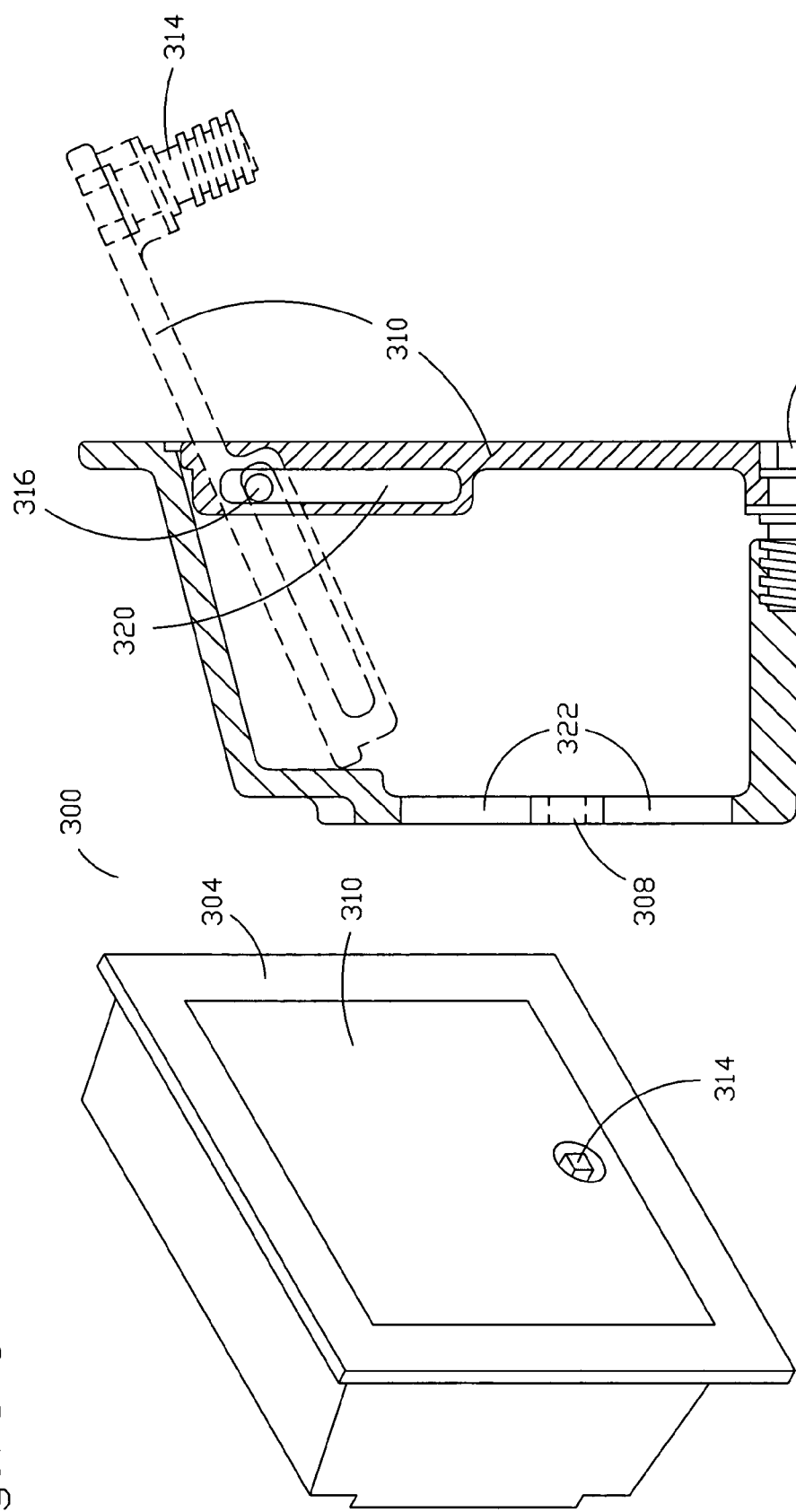
FIG. 6 shows details of the hydrant mounting box.

FIG. 6 shows details of the box 300. FIG. 6a shows the box 300 with the door 310 closed such that the plate 304 and door 310 combine to form a flat surface such that the box 300 will have a clean appearance when placed on the exterior of a building wall W (see FIG. 3). The door 310 can include a threaded lock 314 which can use the same operator key 134 (see FIG. 1) used to operate the hydrant 100, to open and close the door 310. The lock 314 will prevent unauthorized use of the hydrant 100. FIG. 6b shows a cross sectional view of the side of the box 300. Openings 322 can allow a hydrant 100 to be mounted in the box 300 with the pipe 110 extending through the back wall 306 of the box 300 and with the tang 128 engaging the hole 308 as shown in FIG. 3. In FIG. 6b the door 310 is shown in solid lines in the closed position and in dashed lines in a propped open position. The door 310 can be pivotably mounted on the pin 316 which can be part of the box 300. The slot 320 cooperates with a pair of pins 316 to act as a hinge. The slot 320 allows the door 310 to open and also to slide back within the box 300 to the propped open position shown in dashed lines. In the propped open position the door 310 is held out of the way of an operator who wants to reach into the box 300 to turn operator end 132 to operate the hydrant 100.

Figure 7:
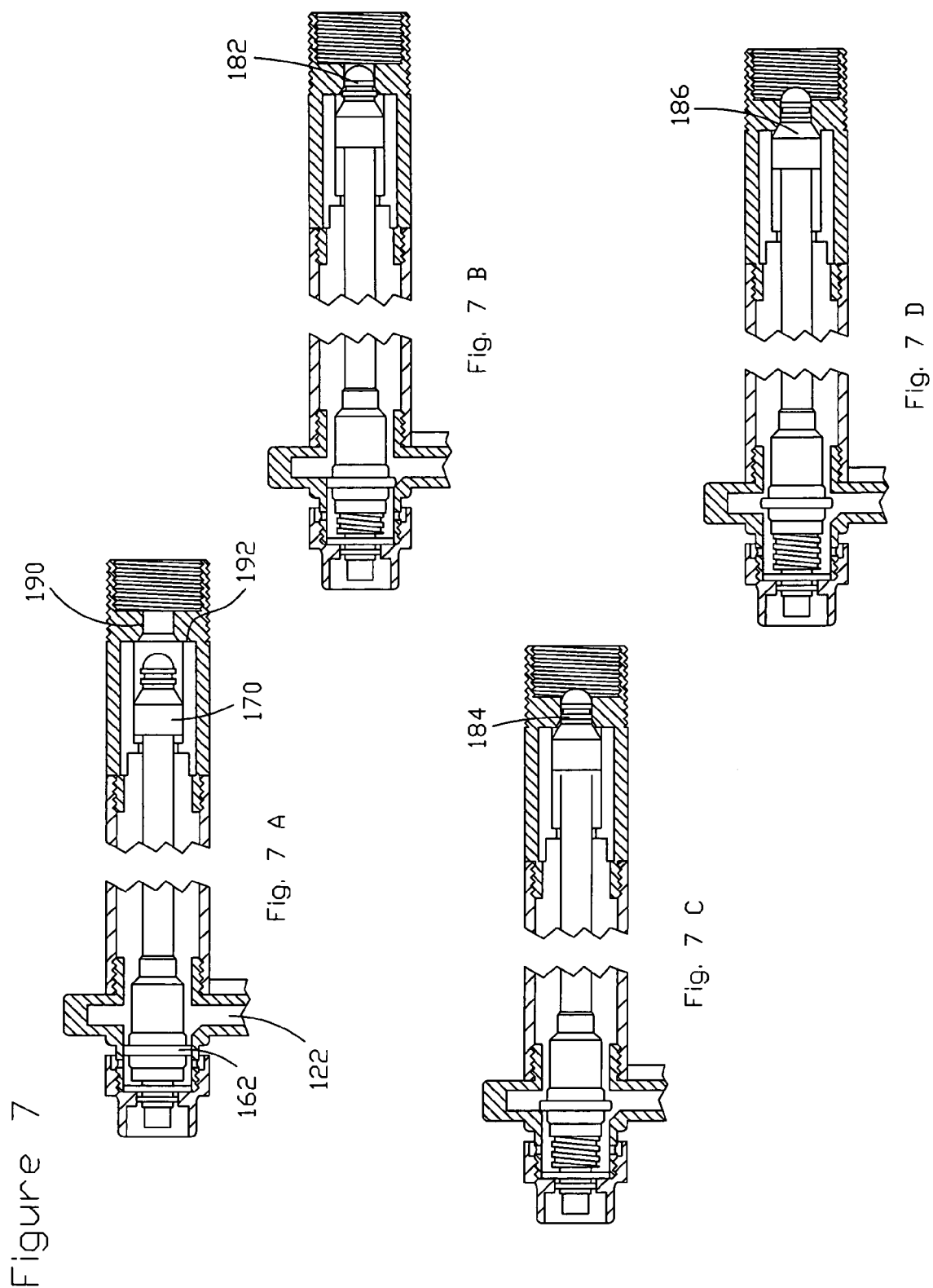
FIG. 7 shows details of the hydrant sealing.

FIG. 7 shows details of the sequence of sealing of the hydrant 100. In FIG. 7a the hydrant is open and water flows from the reduced diameter portion 190 past the stopper 170. In FIG. 7b the seal face 182 frictionally contacts the reduced diameter section 190 and flow will stop. The user of the hydrant 100 may not feel the increased resistance of the seal face 182 frictionally sliding against the reduced diameter portion 190 and will tend to continue to turn the operator end 132 even though the water has stopped flowing. As the operator end 132 continues to turn, FIG. 7c shows that the second seal face 184 frictionally engages the reduced diameter section 190. If the first seal face 182 is worn and allows some water to seep past, the second seal face 184 will stop it. Finally, as shown in FIG. 7d, if the operator end 132 is turned still further the conical seal face 186 of the stopper 170 will engage the face 192 forming a compressive seal and giving the hydrant 100 user a solid feel that the hydrant 100 is completely shut off by substantially resisting the longitudinal motion of stem 150. During the sequence of engagement shown in FIGS. 7b, 7c and 7d water is shut off from the inlet and the "O" ring seal 162 is in shell space 122 shown in FIG. 2 such that holes 125 (FIG. 4) open and water can drain out through holes 125. It can be seen that the compressive seal conical face 186 moves longitudinally only, preventing wear associated with some prior art hydrants that occur when applying compressive force and turning the seal at the same time.

FIG. 8 discloses details of the hydrant 100. The hydrant 100 can include an outlet 104 with a second check valve 400 built in. FIG. 8a shows the second check valve 400 in the closed position. The second check valve 400 is shown in the open position in FIG. 8b. The check valve 400 can include an o-ring 402 that seals the valve 400 against the inside wall of outlet 104. A valve piston 406 can be biased by spring 412 to a normally closed position against a second O-ring 416. The spaced arms 410 can serve to guide the valve piston 406 and support an end of spring 412 while allowing water to flow through when the valve 400 is open. The second check valve 400 can be held in place in the outlet 104 using a step 414 in the vacuum breaker/check valve 140 and a groove 420 into which a portion 422 of the valve 400 will be biased when the second check valve 400 is inserted into the outlet 104.

FIG. 8b shows the path of flow F of water through the second vacuum breaker/check valve 400 when the hydrant 100 is turned on. The water pressure overcomes the pressure applied by spring 412 to open the valve 400 so water can flow. If water from outside the outlet 104 attempts to flow into the hydrant, such as when a vacuum is applied to hydrant inlet 102. The spring 412 will bias the valve 400 closed preventing the undesirable backflow. This arrangement creates a double backflow/double check valve arrangement in a very compact design. The first vacuum breaker check valve 140 contains the outlet 104 and is threaded to the hydrant 100, the second check valve 400 is contained with the outlet 104. The piston 106 extends outside the outlet 104 when the valve 400 is open. This can allow for field testing of the first vacuum breaker/check valve 140 as the second can be held in the open position using the exposed end of piston 406. Having a vacuum breaker/check valve 140, and second check valve 400 gives additional protection against contaminating backflow but also can prevent water from a pressurized hose H from surging out holes 142 when the hydrant 100 is shut off. The second check valve 400 positioned within the vacuum breaker/check valve 140 gives a compact design that is more attractive on the outside of a structure than would be possible with two full size check valve 140 in series.

The hydrant is freeze-less. In operation, and referring to FIG. 7a-d, as water flow through the hydrant 100 is shut off the stopper 170 can move through a progressive sequence of sealing first with the seal face 182 engaging the reduced diameter portion 190, then with the seal face 184 also engaging the reduced diameter portion 190 and finally with the conical face 186 compressively engaging the face 192. During this shutoff sequence water must be free to flow from pipe 110 so that the hydrant 100 can be drained of water that might otherwise freeze. This is accomplished because the large "O" ring seal 162 is, as shown in FIGS. 2 and 7d not forming a seal at opening 124 such that water can flow out of the hydrant 100 through holes 125.

The hydrant has valve stem cap with splash shield. Referring to FIG. 4, the cap 136 includes a flange portion 138 that covers the air holes 125 without sealing them. The purpose is to prevent the hydrant 100 from splashing water back out and getting the user wet when draining. Hydrant 100 splash back can occur when the hydrant user has a hose (H in FIG. 4) attached to the outlet 104 and that hose in turn has a nozzle N such as are commonly used in pressure washing for example. If the user releases the trigger T of nozzle N, the hose H will expand with some pressure, then if the user shuts off the hydrant 100 as described above, and water from the pressurized hose H can momentarily backflow through the holes 142 in a violent spray that can soak a user. The second check valve 400 prevents any such spray from hitting the user by preventing the backflow.

Single hole mounting. As can be seen in FIG. 2 an installer can drill a single diameter mounting hole M through outer wall OW, and inner wall IW. This allows the shell 122 to sit flat against the outer wall OW. This makes installation of the hydrant 100 much easier than prior art freezeless hydrants, with water flow across the face. The projecting tang 128 prevents movement of the hydrant 100 when torque is applied to operator 132. Prior art hydrants typically have a bulky housing adjacent the operator or at least steps in the pipe. FIG. 4 shows that the tang 128 works within the box 300 so that the hydrant 100 can be mounted with or without a box 300.

The invention claimed is:

1. A freezeless hydrant having an inlet and an outlet, said hydrant including:
   an elongated pipe connecting a valve to an operator,
   said operator including an operator end, said operator end including threads;
   a stem having a length and having a first end engaged with said threads and a second end carrying a stopper portion of said valve,
   a portion of said stopper engaging projections on an inner portion of said pipe such that said stem and stopper are held against rotational movement by said projections as a compressive seal face on said stopper engages a surface of a reduced diameter of said pipe,
   rotational movement of said operator results in longitudinal movement of the stem and in closing of said valve by moving said stopper portion and moving said compressive seal face into compressive sealing engagement with said surface of a reduced diameter portion of said pipe,
   wherein said stopper includes a frictional seal face, and wherein upon closing of said valve, said frictional seal face forms a movable frictional seal with said reduced diameter section and wherein said frictional seal moves longitudinally while maintaining a seal prior to said compressive seal face engaging said reduced diameter portion,
   wherein said operator includes holes, said holes allowing water to drain from said hydrant through said operator when said frictional and compressive seal faces engage said reduced diameter portion shutting off flow from said inlet and wherein the first end of said stem includes a seal sealingly separating said holes from said valve when water is flowing through said hydrant and connecting said holes to said valve as said frictional seal face engages said reduced diameter portion.

2. The hydrant of claim 1 wherein said projections include longitudinal extending ribs on the inside of said pipe.

3. The hydrant of claim 1 wherein said stopper includes raised areas that cooperate with said projections to hold said stem against rotation and to guide the longitudinal movement of the stem.

4. The hydrant of claim 1 including a shell portion having a flat mounting portion wherein water flows through said shell from said operator to said outlet and wherein said elongated pipe has a single outside diameter from said shell to an end of said pipe opposite said shell and contains said stem and extends from said flat mounting portion.

5. The hydrant of claim 4 including a tang mounted on said flat mounting portion, wherein said tang is spaced from said pipe portion.

6. A freezeless hydrant having an inlet and an outlet, said hydrant including:
   an elongated pipe connecting a valve to an operator,
   said operator including an end piece said end piece including threads;

a stem having a length and having a first end engaged with said threads and a second end carrying a stopper of said valve, said stopper including a frictional seal face and a compressive seal face such that rotational movement of said operator results in longitudinal movement of the stem and in closing of said valve by moving said frictional seal into movable frictional sealing engagement with a reduced diameter portion of said pipe and wherein said frictional seal moves longitudinally, maintaining its seal, prior to said compressive seal face contacting to form a second seal wherein said operator includes holes, said holes allowing water to drain from said hydrant through said operator when said frictional and compressive seal faces engage said reduced diameter portion shutting off flow from said inlet and wherein the first end of said stem includes an O-ring seal sealingly separating said holes from said valve when water is flowing through said hydrant and connecting said holes to said valve as said frictional seal face engages said reduced diameter portion.

7. The hydrant of claim 6 wherein projections include ribs on the inside of said pipe and wherein the stopper includes raised areas that cooperate with said ribs to hold said stem against rotation and to guide the longitudinal movement of the stem.

8. The hydrant of claim 7 wherein said operator includes holes, said holes allowing water to drain from said hydrant through said operator when said first seal face engages said reduced diameter portion shutting off flow through said inlet and wherein said outlet is contained within a first vacuum breaker check valve and a second check valve contained within said outlet said first vacuum breaker check valve and said second vacuum check valve preventing backflow of water when a vacuum exists at said inlet.

* * * * *